Oct. 8, 1963
B. H. HAMILTON
3,106,674
REGULATOR PROTECTION CIRCUITS
Filed Dec. 15, 1960
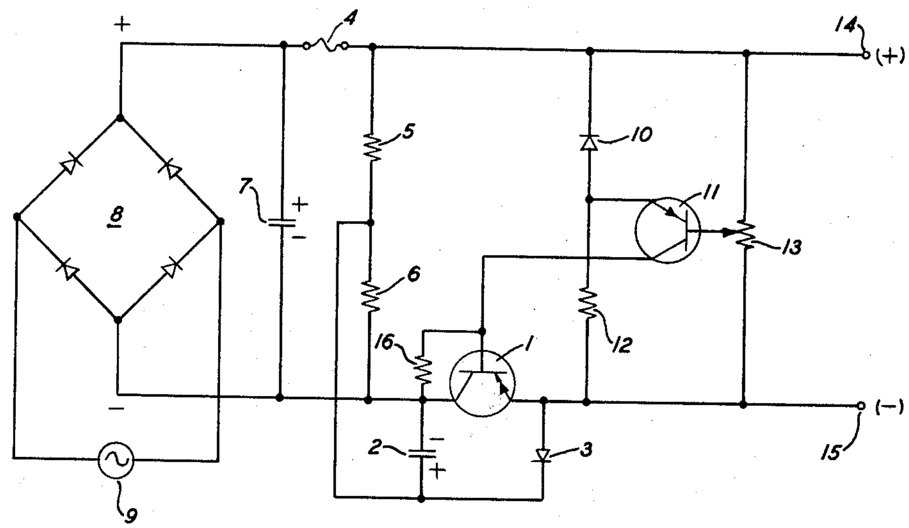
INVENTOR
B. H. HAMILTON
BY V. P. Priolo
ATTORNEY United States Patent Office 3,106,674

Patented Oct. 8, 1963

3,106,674

REGULATOR PROTECTION CIRCUITS

Billy H. Hamilton, Summit, N.J., assignor to Bell Telephone Laboratories, Incorporated, New York, N.Y., a corporation of New York Filed Dec. 15, 1960, Ser. No. 75,972
3 Claims. (Cl. 323—22)

This invention relates to voltage and current regulators and more specifically to protection circuits for said regulators.

In the series transistor regulators taught by the prior art, see for example United States Patent 2,751,549, if the output terminals should accidentally become shorted the energy stored in the input filter capacitor will instantaneously appear across the collector and emitter electrodes of the series regulating transistor. The magnitude of the voltage thus impressed across the transistor collector-emiter electrodes usually exceeds the maximum normal transistor operating voltage and causes permanent damage to the transistor.

The obvious solution to the problem appears to require the insertion of a fuse in series with the circuit output. A fuse, however, has an inherent time lag which extends from the instant of overload to the time it finally "blows." Since the energy stored in the input filter capacitor appears instantaneously across the transistor collector-emitter electrodes when an output "short" occurs, the time lag of the fuse is such that the transistor would be damaged.

I has been found that this disadvantage may be overcome by placing a capacitor across the transistor collector-emitter electrodes in series with the fuse. With this arrangement, if an accidental short should occur across the output terminals, the capacitor would limit the rate of voltage rise across the transistor collector-emitter terminals and at the same time "blow" the fuse to effectively remove the output trouble condition. The presence of the capacitor, however, results in the serious operating disadvantage of interfering with the normal regulating function of the transistor to absorb both a fast input voltage change and the high frequency components of ripple It has also been found that the collector-emitter electrodes of the series regulating transistor may be protected by bridging them with a Zener diode rated for breakdown at a voltage slightly higher than the maximum normal voltage drop across the collector-emitter electrodes. The Zener diode does not interfere with the normal regulating functions of the transistor. However, since Zener diodes with power ratings sufficient to withstand peak surge power are not readily available this method is limited.

It is therefore an object of this invention to provide a regulator protection circuit which does not interfere with normal regulating features.

It is a further object of this invention to provide a regulator protection circuit which comprises readily available components.

It has been found that these objectives may be achieved by employing a capacitor back-biased diode combination bridged across the collector-emitter terminals of the series regulating transistor.

A feature of this invention resides in the use of a voltage divider to predetermine the charge on a capacitor which is bridged across the series regulating transistor together with a series diode, the diode being normally back-biased in such manner that the capacitor does not interfere with the operation of the regulating transistor.

Other objects and features of the present invention will become apparent upon consideration of the following detailed description and the accompanying drawing, the single FIGURE of which is a schematic view of a series voltage regulator embodying the present invention.

As shown in the drawing, there are provided PNP transistors 1 and 11, a Zener asymmetrically conducting device 10, an asymmetrically conducting device 3, a fuse 4, capacitors 2 and 7, and alternating-current source 9, a full-wave rectifier bridge 8, resistors 5, 6, 12 and 16 and an adjustable resistor 13. Terminals 14 and 15 are output terminals.

The input alternating-current source 9 is connected to the input of the full-wave rectifier bridge 8. Filter capacitor 7 is connected across the output of the bridge 8. A voltage divider comprising resistors 5 and 6 is connected across the filter capacitor 7. Fuse 4 is connected between one terminal of the output of bridge 8 and the output terminal 14. The collector-emitter electrodes of transistor 1 are serially connected between the output terminal of the bridge 8 and output terminal 15. Capacitor 2 and asymmetrically conducting device 3 are serially connected across the collector-emitter electrodes of transistor 1. The junction of capacitor 2 and asymmetrically conducting device 3 is connected to the junction of resistors 5 and 6. Zener asymmetrically conducting device 10 and resistor 12 are serially connected across output terminals 14 and 15 as is adjustable resistor 13. The collector of transistor 11 is connected to the base of transistor 1. The emitter of transistor 11 is connected to the junction of Zener asymmetrically conducting device 10 and resistor 12. Resistor 16 is connected across the base-collector electrodes of transistor 1.

The operation of the regulator can be described as follows: If the output voltage across terminals 14 and 15 should become less positive with respect to its normal operating level a portion of this less positive charge determined by adjustable resistor 13 is compared with the standard voltage of Zener asymmetrically conducting device 10 which, in turn, biases the base-emitter junction of transistor 11 such as to decrease the collector-emitter current flow of transistor 11. Decreased current flow through the collector-emitter path of transistor 11 results in increased current flow out of the base of transistor 1, thus biasing transistor 1 further into conduction which, in turn, results in greater emitter-collector current flow through transistor 1. (The current through biasing resistor 16 does not change appreciably.) Increased current flow through the emitter-collector path of transistor 1 results in increased current flow through the load connected to the output terminals 14 and 15, thus compensating for the original less positive change across output terminals 14 and 15.

The potential stored in input filter capacitor 7 is of the same magnitude as the potential appearing across the output terminals of the bridge rectifier 8. The magnitude of the potential stored in capacitor 2 is determined by the voltage divider comprising resistors 5 and 6 and is thus intermediate to the potential appearing across capacitor 7. The charge on capacitor 2 is of the polarity shown on the drawing, from which it is readily seen that conventional asymmetrically conducting device 3 is back-biased under normal operating conditions.

If the output terminals 14 and 15 were to become accidentally shorted in a regulator structure wherein capacitor 2, asymmetrically conducting device 3, and resistors 5 and 6 are not employed, the potential stored in input filter capacitor 7 would instantaneously appear across the collector-emitter electrodes of series regulating transistor 1 causing, as heretofore noted, permanent transistor damage. In the configuration of the present invention, it is apparent that in the event of accidental shorting of output terminals 14 and 15 the charge on capacitor 7 will bias asymmetrically conducting device 3 into conduction and thereby permit capacitor 2 to slowly begin to charge to the higher potential of capacitor 7. The period of time required for capacitor 2 to charge to the higher potential is many times greater than the period of time required for fuse 4 to "blow" and open the circuit to effectively remove the trouble condition. In a similar manner the collector-emitter electrodes of transistor 1 are also protected from transients which occur during the initial turn-on of the circuit. Voltage transients at turn-on are occasioned by the presence of capacitance in the load circuit.

It should be understood that combinations of NPN and PNP transistors other than those shown may be used equally as effectively.

Since changes may be made in the above-described arrangement and different embodiments may be devised by those skilled in the art without departing from the spirit and scope of the invention, it is to be understood that all matter contained in the foregoing description and accompanying drawing is illustrative of the application of the principles of the invention and is not to be construed in a limiting sense.

What is claimed is:

1. A voltage variation protected regulator circuit comprising first variable impedance means for controlling the current flowing from an unregulated source of potential to a load, passive impedance means including a diode which is forward biased in the event of variations in said unregulated source of potential or across said load to protect said variable impedance means, means for connecting said passive impedance means across said first impedance means, and means for reverse biasing said passive impedance means with a portion of the unregulated potential of said unregulated source of potential whereby said first impedance means is protected from input and output voltage variations due to input source or load malfunctions or characteristics.

2. In a voltage regulator which includes a source of direct potential, a load, and a regulating transistor having its emitter-collector path connected in series between said source and said load, an arrangement for protecting said transistor against damage during at least transient short-circuited load conditions which comprises a network consisting of a capacitor and a diode connected in series with one another directly between the emitter and collector electrodes of said transistor, said diode being poled in the direction of current flow through said load from said source, and means to bias said diode in the reverse direction by a potential less than the potential of said source.

3. In a voltage regulator which includes a source of direct potential, a load, a regulating transistor having its emitter-collector path connected in series between said source and said load, and a fuse connected to carry the current flowing from said load to said source, an arrangement for protecting said transistor against damage from short-circuited load conditions which comprises a network consisting of a capacitor and a diode connected in series with one another directly between the emitter and collector electrodes of said transistor, said diode being poled in the direction of current flow through said load from said source, and means to bias said diode in the reverse direction by a potential less than the potential of said source, whereby said network bypasses said transistor during transient short-circuited load conditions and bypasses said transistor until said fuse blows during persisting short-circuited load conditions.

References Cited in the file of this patent

UNITED STATES PATENTS

| | | |
|---|---|---|
| 2,904,742 | Chase | Sept. 15, 1959 |
| 2,922,945 | Norris et al. | Jan. 26, 1960 |
| 2,925,548 | Scherer | Feb. 16, 1960 |
| 2,967,991 | Deuitch | Jan. 10, 1961 |